United States Patent [19]

Nomura et al.

[11] Patent Number: 4,513,408
[45] Date of Patent: Apr. 23, 1985

[54] ERROR DETECTING SYSTEM OF VIDEO/AUDIO DISC PLAYER

[75] Inventors: Susumu Nomura; Katsuharu Sato, both of Tokorozawa, Japan

[73] Assignee: Pioneer Video Corporation, Tokyo, Japan

[21] Appl. No.: 384,244

[22] Filed: Jun. 2, 1982

[30] Foreign Application Priority Data

Jun. 5, 1981 [JP] Japan ............................. 56-082958[U]

[51] Int. Cl.³ ............................................... G11B 7/00
[52] U.S. Cl. ..................................................... 369/46
[58] Field of Search ..................... 369/45, 46, 44, 122; 250/201

[56] References Cited

U.S. PATENT DOCUMENTS

| 4,051,527 | 9/1977 | Braat | 369/45 |
| 4,059,841 | 11/1977 | Bricot et al. | 369/46 |
| 4,074,314 | 2/1978 | Velzel et al. | 369/45 |
| 4,345,321 | 8/1982 | Arquie et al. | 369/46 |
| 4,411,500 | 10/1983 | Yonezawa et al. | 369/122 |

FOREIGN PATENT DOCUMENTS

| 56-47931 | 4/1981 | Japan | 369/45 |
| 56-105342 | 8/1981 | Japan | 369/46 |

Primary Examiner—Donald McElheny, Jr.
Attorney, Agent, or Firm—Fleit, Jacobson, Cohn & Price

[57] ABSTRACT

In a video and/or audio disc information reproducing apparatus in which the video and/or audio information carried on a video and/or audio disc is picked up with a beam of light incident on the disc to trace the record track on the disc, an error detecting system comprising optical means to emit a beam of light for tracing the record track and producing a signal-carrying beam of light carrying signals picked up from the record track, beam-splitting means to split the signal-carrying beam into two component beams, light-sensitive transducer means responsive to the component beams and having at least four discrete light-sensitive surfaces separate from one another across a first junction line parallel with a line tangent to the record track and a second junction line parallel with a line perpendicular to the record track, the transducer means being operative to produce a first error signal representative of the difference between the intensities of light incident on the light-sensitive surfaces separate from each other across the first junction line and a second error representative of the difference between the intensities of the light respectively incident on the light-sensitive surfaces separate across the second junction line.

3 Claims, 12 Drawing Figures

ERROR DETECTING SYSTEM OF VIDEO/AUDIO DISC PLAYER

FIELD OF THE INVENTION

The present invention relates to a video and/or audio information reproducing apparatus and, particularly, to an error detecting system for use in the video and/or audio information reproducing apparatus.

SUMMARY OF THE INVENTION

In accordance with the present invention, there is provided in a video and/or audio disc information reproducing apparatus in which the video and/or audio information carried on a video and/or audio disc is rotatable about the center axis thereof and having an information-carrying face formed, about the center axis of the disc, with a record track having the information stored thereon. The information is picked up with a beam of light incident on the information-carrying face tracing the record track. An error detecting system comprising optical means operative to emit a beam of light for tracing the record track and producing a signal-carrying beam of light carrying signals picked up from the record track while the disc is being rotated about the center axis thereof, beam-splitting means adapted to split the signal-carrying beam of light into two component beams of light, a light-sensitive transducer means responsive to the component beams of light and having at least four discrete light-sensitive surfaces separate from one another across at least two junction lines. A first junction line substantially parallel with a line tangent to the record track and a second junction line parallel with a line perpendicular to the record track. The transducer means being operative to produce a first error signal representative of the difference between the intensities of light incident on the light-sensitive surfaces separate from each other across the first junction line and a second error signal representative of the difference between the intensities of the light respectively incident on the light-sensitive surfaces separate from each other across the second junction line.

BRIEF DESCRIPTION OF THE DRAWINGS

Drawbacks of a prior-art error detecting system of a video and/or audio information reproducing apparatus and detailed features and advantages of an error detecting system according to the present invention will be understood from the following description taken in conjunction with the accompanying drawings, in which.

DESCRIPTION OF THE PRIOR ART

Figure 1:
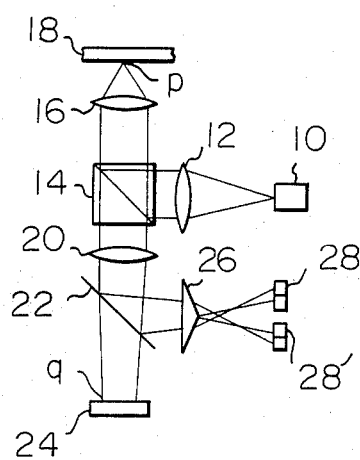
FIG. 1 is a schematic plan view of a known error detecting system of a video and/or audio information reproducing apparatus.

In a prior-art error detecting system of an optical video and/or audio player as shown in FIG. 1, a beam of light emitted from a light source 10 is passed through a collimator lens 12 and is thereby rendered into a collimated beam of light. The collimated beam of light enters a beam splitter prism 14 composed of a pair of equilaterally pentahedral component segments. The collimated beam of light proceding from the collimator lens 12 enters the beam splitter prism 14 at the angles of 45 degrees to the inclined junction plane between the respective base surfaces of the component segments of the prism 14 and leaves the beam splitter prism 14 at right angles to the direction in which the beam of light from the collimator lens 12 is incident on the prism 14. The beam of light thus leaving the beam splitter prism 14 is passed through a light-condensing lens 16 and is incident on an information-carrying surface of of a video and/or audio disc 18 rotating about the center axis thereof. As is well known in the art, a video and/or audio disc has recorded on its information-carrying surface signals representative of the information to be reproduced. Such signals are recorded on the disc 18 in the form of a series of depressed areas or "pits" in the information-carrying surface of the disc. Though not shown in the drawings, the pits are arranged in a spiral record track or a number of concentric record tracks about the center axis of the disc 18. The video and/or audio information to be reproduced is read out from the disc 18 by tracing the individual pits along the spiral record track or each of the concentric record tracks of the disc 18 with the beam of light incident on the information-carrying surface of the disc through the light-condensing lens 16.

The beam of light thus incident on the video and/or audio disc 18 is focused on the record track on the disc 18 and forms a circular light spot on the information-carrying surface of the disc as indicated at p in FIG. 1 and is reflected backwardly from the disc 18. The beam of light reflected from the disc 18 is passed backwardly through the light-condensing lens 16 and for a second time enters the beam splitter prism 14. The beam of light advances from the beam splitter prism 14 through a light-condensing lens 20 to a semi-reflective mirror 22 positioned to have a mirror plane at the angles of 45 degrees to the path of light through the beam splitter prism 14 and the light-condensing lens 20. The beam of light incident on the semi-reflective mirror 22 is in part transmitted through the mirror 22 toward a light-sensitive transducer element 24 and in part reflected from the mirror 22 toward an equilateral beam splitter prism 26 and further through the beam splitter prism 26 toward a pair of light-sensitive transducer elements 28 and 28'. The light-sensitive transducer element 24 is located in line with the disc 18 and the beam splitter prism 14 and constitutes in the video and/or audio player a tracking error detector to produce signals variable in magnitude depending upon the intensity of the beam of light incident on the transducer element 24. On the other hand, the beam splitter prism 26 has a triangular cross section having a base surface directed at right angles to the semi-reflective mirror 22, and a pair of side surfaces inclined at predetermined equal angles to the base surface of the prism 26. The beam splitter prism 26 is adapted to transmit an incident beam of light through the inclined side surfaces, respectively, of the prism 26 and to thereby split the incident light into two halves in cross section and is positioned in such a manner that the edge line between the inclined side surfaces of the prism 26 extends perpendicularly to a tangent to the spiral or concentric record track being traced by the beam of light incident on the disc 18. The beam of light entering the beam splitter prism 26 from the semi-reflective mirror 22 is, thus, split by the beam splitter prism 26 into two component beams having semicircular cross sections symmetric to each other in a direction in which the record track extends on the information-carrying surface of the disc 18. The two component beams of light respectively transmitted through the inclined side surfaces of the prism 26 are incident on the transducer elements 28 and 28', respectively. The transducer elements 28 and 28' constitute in the video and/or audio player focus error detectors to produce signals which are variable in magnitude with the intensities of the beams of light incident on the transducer element 28 and 28', respectively.

Figure 2:
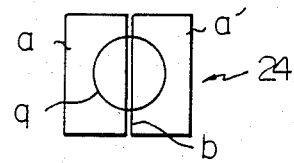
FIG. 2 is a plan view showing the configurations of the light-sensitive surfaces of a transducer element included in the prior-art error detecting system shown in FIG. 1.

The transducer element 24 constituting the tracking error detector has a pair of discrete light-sensitive surfaces a and a' which are separate from each other across a junction line b as shown in FIG. 2 of the drawings. The junction line b between the light-sensitive surfaces a and a' extends in a direction parallel with a line tangent to the record track being traced by the beam of light incident on the disc 18. If, thus, the light spot p of the beam of light incident on the information-carrying surface of the disc 18 is located correctly on a target track on the disc 18 in a radial direction of the disc 18, the beam of light incident on the transducer element 24 forms a circular light spot q having its center point located at the junction line b between the light-sensitive surfaces a and a' of the transducer element 24 as shown in FIG. 2. Under these conditions, the light spot q on the transducer element 24 has one of its half areas located on one of the light-sensitive surfaces a and a' and the other of the half areas located on the other of the light-sensitive surfaces a and a'. If, on the other hand, the light spot p of the beam of light incident on the disc 18 fails to be located correctly on the target track radially of the disc 18, then the light spot q of the beam of light incident on the transducer element 24 has its center point located on either the light-sensitive surface a or the light-sensitive surface a' of the transducer element 24 and accordingly has a larger-area portion located on one of the light-sensitive surfaces a and a' and a smaller-area portion located on the other of the light-sensitive surfaces a and a'. The light-sensitive surfaces a and a' of the transducer element 24 are adapted to produce electric output signals which vary in magnitude respectively with the discrete areas of the light spot q on the light-sensitive surfaces, viz., with the intensities Ia and Ia' of light detected by the light-sensitive surfaces a and a' of the transducer element 24. The output signals thus produced by the light-sensitive surfaces a and a' are processed to produce a tracking error signal representative of the difference between the intensities Ia and Ia' of light detected by the light-sensitive surfaces a and a' of the transducer element 24. As is well known in the art, the tracking error signal thus produced is fed to the tracking servo system (not shown) of the video and/or audio player and is utilized to control the position of the information signal pick-up unit (not shown) from which an information pick-up beam is radiated toward the target track of the rotating video and/or audio disc 18 during playback of the disc 18.

Figure 3A:
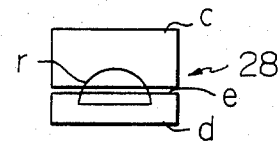
FIGS. 3A and 3B are plan views showing the configurations of the light-sensitive surfaces of other transducer elements included in the prior-art error detecting system shown in FIG. 1.
Figure 3B:
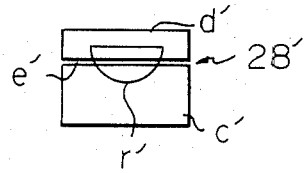

Each of the light-sensitive transducer elements 28 and 28' constituting the focus error detectors in the video and/or audio player as above described also has two discrete light-sensitive surfaces. Thus, one transducer element 28 has first and second light-sensitive surfaces c and d separate from each other across a junction line e as shown in FIG. 3A and, likewise, the other transducer element 28' has first and second light-sensitive surfaces c' and d' separate from each other across a junction line e' as shown in FIG. 3B. Each of the junction lines e and e' extends in a direction parallel with a line perpendicular to the record track being traced by the beam of light incident on the disc 18. If, thus, the light spot p of the beam of light incident on the disc 18 is focused correctly on the target track on the disc 18 in a direction in which the target track extends on the disc 18, the beams of light incident on the transducer elements 28 and 28' from the beam splitter prism 26 form a semicircular circular light spot r on the discrete first and second light-sensitive surfaces c and d of the transducer element 28 and a semicircular light spot r' on the discrete first and second light-sensitive surfaces c' and d' of the transducer element 28'. In this instance, each of the semicircular light spots r and r' of the transducer elements 28 and 28' has a portion on each of the light-sensitive surfaces c and c' and a portion on each of the light-sensitive surfaces d and d' as shown in FIGS. 3A and 3B. If, on the other hand, the light spot p of the beam of light incident on the disc 18 fails to be located correctly on the target track radially of the disc 18, then the semicircular light spots r and r' of the beams of light are respectively displaced perpendicularly across the junction lines e and e'. The light-sensitive surfaces c and d of the transducer element 28 are adapted to produce electric output signals which vary in magnitude respectively with the discrete areas of the light spot r on the light-sensitive surfaces c and d, viz., with the intensities Ic and Id of light respectively detected by the light-sensitive surfaces c and d of the transducer element 28. Likewise, the light-sensitive surfaces c' and d' of the transducer element 28' are adapted to produce electric output signals which vary in magnitude respectively with the discrete areas of the light spot r' on the light-sensitive surfaces c' and d', viz., with the intensities Ic' and Id' of light respectively detected by the light-sensitive surfaces c' and d' of the transducer element 28'. The output signals thus produced by the transducer element 28 are processed to produce a signal representative of the sum (Ic+Id) of the intensities Ic and Id of light detected by the light-sensitive surfaces c and d of the transducer element 28 and, similarly, the output signals produced by the light-sensitive transducer elements 28' are processed to produce a signal representative of the sum (Ic'+Id') of the intensities Ic' and Id' of light detected by the light-sensitive surfaces c' and d' of the transducer element 28'. These two signals are further processed to produce a focus error signal representative of the difference in magnitude between the sum of the intensities Ic+Id of light and the sum of the intensities Ic' and Id' of light. As is well known in the art, the focus error signal thus produced is fed to the focus servo system (not shown) of the video and/or audio player and is utilized to control the position of the previously mentioned light-condensing lens (FIG. 1) with respect to the target track on the rotating video and/or audio disc 18 during playback of the disc 18.

The prior-art error detecting system of the nature hereinbefore described has a drawback in that a total of three light-sensitive transducer elements 24, 28 and 28' are used in the system and, for this reason, not only makes the error detecting system intricate in construction but makes it difficult to have the pick-up device constructed compactly. An object of the present invention is to eliminate such a drawback of a prior-art error detecting system of a video and/or audio player.

DESCRIPTION OF THE PREFERRED EMBODIMENTS

Figure 4:
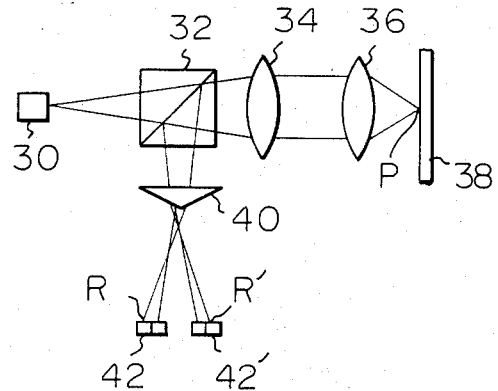
FIG. 4 is a schematic plan view of a preferred embodiment of an error detecting system of a video and/or audio information reproducing apparatus according to the present invention.

Referring to FIG. 4, an error detecting system embodying the present invention is shown comprising a suitable light source 30 such as a semiconductor laser radiation element operative to emit a beam of light, and a beam splitter prism 32 located on the path of the beam of light emitted from the light source 30. The beam splitter prism 32 is composed of a pair of equilaterally pentahedral component segments cemented together over their respective base surfaces each inclined at the angle of 45 degrees with respect to the side surfaces of the segments. The beam of light proceding from the light source 30 enters the beam splitter prism 32 at the angles of 45 degrees to the inclined junction plane between the respective base surfaces of the component segments of the prism 32 and is transmitted through the junction plane to a collimator lens 34 positioned in alignment with the light source 30 across the beam splitter prism 32. The beam of light transmitted through the beam splitter prism 32 is further passed through the collimator lens 34 and is rendered into a collimated beam of light. The collimated beam of light leaving the collimator lens 34 is incident on an information-carrying surface of of a video and/or audio disc 38 rotating about the center axis thereof.

The beam of light thus incident on the video and/or audio disc 38 is focused on the spiral record track or any one of the concentric record tracks on the disc 38 and forms a circular light spot on the information-carrying surface of the disc as indicated at P in FIG. 4 and is reflected backwardly from the information-carrying surface of the disc 38. The beam of light reflected from the information-carrying surface of the disc 38 is passed backwardly through the light-condensing lens 36 and the collimator lens 34 and for a second time enters the beam splitter prism 32. The beam of light thus incident backwardly on the beam splitter prism 32 is reflected from the junction plane between the component segments of the prism 32 at the angles of 45 degrees to the junction plane and is caused to advance from the junction plane at right angles to the path of the beam of light reflected from the disc 38. The beam of light emanating from from the beam splitter prism 32 to is transmitted through an equilateral beam splitter prism 40 to first and second light-sensitive transducer elements 42 and 42'. The beam splitter prism 40 has a triangular cross section having a base surface directed at right angles to the junction plane in the beam splitter prism 32 and accordingly perpendicular to the path of the light from the prism 32, and a pair of side surfaces inclined at predetermined equal angles to the base surface of the prism 40 as shown. Similarly to the beam splitter prism 26 in the prior-art error detecting system shown in FIG. 1, the beam splitter prism 40 is adapted to transmit an incident beam of light through the inclined side surfaces, respectively, of the prism 40 and thereby split the incident light into two halves in cross section and is positioned in such a manner that the edge line between the inclined side surfaces of the prism 40 extends perpendicularly to a tangent to the spiral or concentric record track being traced by the beam of light incident on the disc 38. The beam of light entering the beam splitter prism 40 from the beam-splitter prism 32 is, thus, split by the beam splitter prism 40 into two component beams of light having semicircular cross sections symmetric to each other in a direction in which the record track extends on the information-carrying surface of the disc 38. The two component beams of light respectively transmitted through the inclined side surfaces of the prism 40 are incident on the transducer elements 42 and 42', respectively. The first and second transducer elements 42 and 42' are located at right angles to the path of the beam of light between the light source 30 and the beam splitter prism 32 and constitute in the video and/or audio player tracking and focus error detectors operative to produce electric signals which are variable in magnitude with the intensities of the beams of light incident on the transducer element 42 and 42', respectively.

Figure 5A:
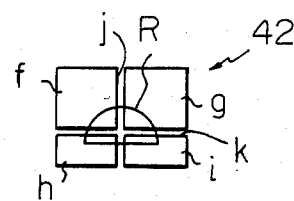
FIGS. 5A and 5B are plan views showing the configurations of the light-sensitive surfaces of the transducer elements included in the detecting system shown in FIG. 4.
Figure 5B:
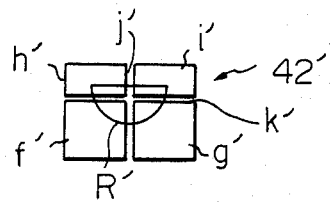

Each of the first and second transducer elements 42 and 42' constituting the tracking and focus error detector in the video and/or audio player as above described has four discrete light-sensitive surfaces which are separate from one another across two perpendicularly intersecting junction lines. Thus, the first transducer element 42 has first, second, third and fourth light-sensitive surfaces f, g, h and i separate from one another across first and second junction lines j and k as shown in FIG. 5A and, likewise the second transducer element 42' has first, second and fourth discrete light-sensitive surfaces f', g', h' and i' which are separate from one another across first and second junction lines j' and k' as shown in FIG. 5B of the drawings. Each of the first junction line j between the first and second light-sensitive surfaces f and g and between the third and fourth light-sensitive surfaces h and i of the first transducer element 42 and the first junction line j' between the first and second light-sensitive surfaces f' and g' and between the third and fourth light-sensitive surfaces h' and i' of the second transducer element 42' extends in a direction parallel with a line tangent to the spiral or concentric record track being traced by the beam of light incident on the disc 38. Furthermore, each of the second junction line k between the first and third light-sensitive surfaces f and h and between the second and fourth light-sensitive surfaces g and i of the first transducer element 42 and the second junction line k' between the first and third light-sensitive surfaces f' and h' and between the second and fourth light-sensitive surfaces g' and i' of the second transducer element 42' extends in a direction parallel with a line perpendicular to the spiral or concentric record track being traced by the beam of light incident on the disc 38.

If, thus, the light spot P of the collimated and condensed beam of light incident on the information-carrying surface of the video and/or audio disc 38 is located and focused correctly on the target track on the disc 38 in a radial direction of the disc 38 and further in a direction in which the target track extends on the disc 38, the beams of light incident on the first and second transducer elements 42 and 42' from the beam splitter prism 40 form a semicircular circular light spot R on the discrete light-sensitive surfaces f, g, h and i of the transducer element 42 and a semicircular light spot R' on the discrete light-sensitive surfaces f', g', h' and i' of the transducer element 42'. In this instance, the semicircular light spots R on the first transducer element 42 has two sector-shaped portions respectively located on the first and second light-sensitive surfaces f and g of the transducer element 42 and two elongated portions respectively located on the third and fourth light-sensitive surfaces h and i of the transducer element 42 as shown in FIG. 5A and, similarly, the semicircular light spots R' on the second transducer element 42' has two sector-shaped portions respectively located on the first and second light-sensitive surfaces f' and g' of the transducer element 42' and two elongated portions respectively located on the third and fourth light-sensitive surfaces h' and i' of the transducer element 42' as shown in FIG. 5B. When the light spot P of the beam of light incident on the video and/or audio disc 38 is correctly located on the target track of the disc 18, the sector-shaped portions of the light spot R on the first and second light-sensitive surfaces f and g of the first transducer element 42 are identical in shape and area to each other and further to the sector-shaped portions of the light spot R' on the first and second light-sensitive surfaces f' and g' of the second transducer element 42' and, similarly, the elongated portions of the light spot R on the third and fourth light-sensitive surfaces h and i of the first transducer element 42 are identical in shape and area to each other and further to the sector-shaped portions of the light spot R' on the third and fourth light-sensitive surfaces h' and i' of the second transducer element 42'.

If, on the other hand, the light spot P of the beam of light incident on the video and/or audio disc 38 fails to be located correctly on the target track in a radial direction of the disc 18 and further in a direction in which the record track being traced extends on the disc 38, then the semicircular light spots R and R' of the beams of light incident on the transducer elements 42 and 42' from the beam splitter prism 40 are respectively displaced perpendicularly across the first junction lines j and j' of the first transducer element 42 and/or the second junction lines k and k' of the second transducer element 42', though not shown in the drawings. The light-sensitive surfaces f, g, h and i of the first transducer element 42 are adapted to produce electric output signals which vary in magnitude respectively with the discrete areas of the light spot R on the light-sensitive surfaces f to i, viz., with the intensities If, Ig, Ih and Ii of light respectively detected by the light-sensitive surfaces f, g, h and i of the transducer element 42. Likewise, the light-sensitive surfaces f', g', h' and i' of the second transducer element 42' are adapted to produce electric output signals which vary in magnitude respectively with the discrete areas of the light spot R' on the light-sensitive surfaces f' to i', viz., with the intensities If', Ig', Ih' and Ii' of light respectively detected by the light-sensitive surfaces f', g', h' and i' of the transducer element 42'.

The output signals thus produced by the first light-sensitive transducer element 42 are processed to produce a signal representative of the sum (If+Ig+Ih+Ii) of the intensities If, Ig, Ih and Ii of light detected by the first, second, third and fourth light-sensitive surfaces f, g, h and i, respectively, of the transducer element 42. Similarly, the output signals produced by the second light-sensitive transducer element 42' are processed to produce a signal representative of the sum (If'+Ig'+Ih'+Ii') of the intensities If', Ig', Ih' and Ii' of light detected by the first, second, third and fourth light-sensitive surfaces f', g', h' and i', respectively, of the transducer element 42'. These two signals are further processed to produce a tracking error signal representative of the difference in magnitude between the sum (If+Ig+Ih+Ii) of the intensities If, Ig, Ih and Ii of light and the sum (If'+Ig'+Ih'+Ii') of the intensities If', Ig', Ih' and Ii' of light. The tracking error signal is thus representative of the value (If+Ig+Ih+Ii)−(If'+Ig'+Ih'+Ii'). The tracking error signal thus produced is fed to the tracking servo system (not shown) of the video and/or audio player and is utilized to control the position of the information signal pick-up unit (not shown) from which an information pick-up beam is radiated toward the target track of the rotating video and/or audio disc 38 during playback of the disc 38.

The output signals produced by the first and second light-sensitive transducer elements 42 and 42' are further processed to produce a signal representative of the sum (If+Ig+If'+Ig') of the intensities If and Ig of light detected by the first and second light-sensitive surfaces f and g of the first transducer element 42 and the intensities If' and Ig of light detected by the first and second light-sensitive surfaces f' and g' of the second transducer element 42' and a signal representative of the sum (Ih+Ii+Ih'+Ii') of the intensities Ih and Ii of light detected by the third and fourth light-sensitive surfaces h and i of the first transducer element 42 and the intensities Ih' and Ii' of light detected by the third and fourth light-sensitive surfaces h' and i' of the second transducer element 42'. These two signals are further processed to produce a focus error signal representative of the difference in magnitude between the sum (If+Ig+If'+Ig') of the intensities If, Ig, If' and Ig' of light and (Ih+Ii+Ih'+Ii') of the intensities Ih, Ii, Ih' and Ii' of light. The focus error signal is thus representative of the value (If+Ig+If'+Ig')−(Ih+Ii+Ih'+Ii'). The focus error signal thus produced is fed to the focus servo system (not shown) of the video and/or audio player and is utilized to control the position of the previously mentioned light-condensing lens (FIG. 1) with respect to the target track on the rotating video and/or audio disc 38 during playback of the disc 38.

Figure 6A:
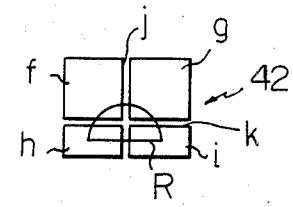
FIGS. 6A and 6B are similar to FIGS. 5A and 5B but show modified configurations of the light-sensitive surfaces shown in FIGS. 5A and 5B.
Figure 6B:
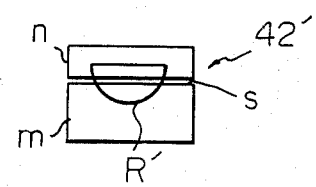

FIGS. 6A and 6B of the drawings show modifications of the first and second light-sensitive transducer elements 42 and 42' hereinbefore described with reference to FIGS. 5A and 5B. The configurations of the light-sensitive surfaces of the first transducer element 42 shown in FIG. 6A are similar to those of the light-sensitive surfaces of the transducer element 42 illustrated in FIG. 5A and, thus, the transducer element 42 shown in FIG. 6A has first, second, third and fourth light-sensitive surfaces f, g, h and i separate from one another across first and second junction lines j and k. On the other hand, the second transducer element 42' shown in FIG. 6B has only two discrete light-sensitive surfaces consisting of first and second light-sensitive surfaces m and n which are separate from each other across a junction line s. The junction line s between the first and second light-sensitive surfaces m and n of the transducer element 42′ is similar to the second junction line k′ in the transducer element 42′ shown in FIG. 5B and, thus, extends in a direction parallel with a line perpendicular to the spiral or concentric record track being traced by the beam of light incident on the disc 38 (FIG. 4). The first light-sensitive surface m of the transducer element 42′ shown in FIG. 6A is identical in shape and area to the combination of the first and second light-sensitive surfaces f′ and g′ of the transducer element 42′ shown in FIG. 5B and, likewise, the second n of the transducer element 42′ shown in FIG. 6B is identical in shape and area to the combination of the third and fourth light-sensitive surfaces h′ and i′ of the transducer element 42′ shown in FIG. 5B. The light-sensitive surfaces m and n of the transducer element 42′ shown in FIG. 6B are also adapted to produce electric output signals which vary in magnitude respectively with the discrete areas of the light spot R′ on the light-sensitive surfaces m and n, viz., with the intensities Im and In of light respectively detected by the light-sensitive surfaces m and n of the transducer element 42′.

In the error detecting system using the light-sensitive transducer elements 42 and 42′ respectively shown in FIGS. 6A and 6B, the output signals produced by the first transducer element 42 are processed to produce a tracking error signal representative of the difference between the sum (If+Ih) of the intensities If and Ih of light detected by the first and third light-sensitive surfaces f and h, respectively, and the sum (Ig+Ii) of the intensities Ig and Ii of light detected by the second and fourth light-sensitive surfaces g and i, respectively, of the transducer element 42. The tracking error signal is thus representative of the value (If+Ih−Ig−Ii). The output signals produced by the first and second light-sensitive transducer elements 42 and 42′ are further processed to produce a focus error signal representative of the difference between the sum (If+Ig+Im) of the intensities If and Ig of light detected by the first and second light-sensitive surfaces f and g of the first transducer element 42 and the intensity Im of light detected by the first light-sensitive surface m of the second transducer element 42′ and the sum (Ih+Ii+In) of the intensities Ih and Ii of the third and fourth light-sensitive surfaces h and i of the first transducer element 42 and the intensity of light detected by the second light-sensitive surface n of the second transducer element 42′. The focus error signal produced in the error detecting system using the first and second transducer elements 42 and 42′ respectively shown in FIGS. 6A and 6B is thus representative of the value (If+Ig+Im)−(Ih+Ii+In).

Figure 7A:
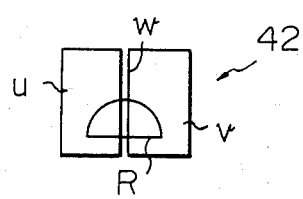
FIGS. 7A and 7B are also similar to FIGS. 5A and 5B but show the other configurations of the light-sensitive surfaces shown in FIGS. 5A and 5B.
Figure 7B:
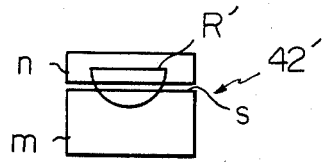

FIGS. 7A and 7B of the drawings show further modifications of the first and second light-sensitive transducer elements 42 and 42′ described with reference to FIGS. 5A and 5B. The configurations of the light-sensitive surfaces of the second transducer element 42′ shown in FIG. 6B are similar to those of the light-sensitive surfaces of the transducer element 42′ illustrated in FIG. 6B and, thus, the transducer element 42 shown in FIG. 7B has first and second light-sensitive surfaces m and n which are separate from each other across a junction line s. On the other hand, the first transducer element 42 shown in FIG. 7A has two discrete light-sensitive surfaces consisting of first and second light-sensitive surfaces u and v which are separate from each other across a junction line w. The junction line w between the first and second light-sensitive surfaces u and v of the transducer element 42′ is similar to the first junction line j in the transducer element 42 shown in FIG. 5A and, thus, extends in a direction parallel with a line tangential to the spiral or concentric record track being traced by the beam of light incident on the disc 38 (FIG. 4). The first light-sensitive surface u of the transducer element 42 shown in FIG. 7A is identical in shape and area to the combination of the first and third light-sensitive surfaces f and h of the transducer element 42 shown in FIG. 5A and, likewise, the second v of the transducer element 42 shown in FIG. 7A is identical in shape and area to the combination of the second and fourth light-sensitive surfaces g and i of the transducer element 42 shown in FIG. 5B. The light-sensitive surfaces u and v of the transducer element 42 shown in FIG. 7A are also adapted to produce electric output signals which vary in magnitude respectively with the discrete areas of the light spot R on the light-sensitive surfaces u and v, viz., with the intensities Iu and Iv of light detected by the light-sensitive surfaces u and v of the transducer element 42.

In the error detecting system using the light-sensitive transducer elements 42 and 42′ respectively shown in FIGS. 7A and 7B, the output signals produced by the first transducer element 42 are processed to produce a tracking error signal representative of the difference (Iu−Iv) between the intensities Iu and Iv of light detected by the first and second light-sensitive surfaces u and v of the first transducer element 42. On the other hand, the output signals produced by the second light-sensitive transducer element 42′ are processed to produce a focus error signal representative of the difference (Im−In) between the intensities Im and In of light detected by the first and second light-sensitive surfaces m and n, respectively, of the second 42′.

Figure 8:
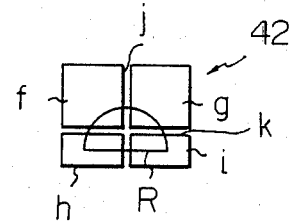
FIG. 8 is a plan view showing the configurations of the light-sensitive surfaces of another form of transducer element as a modification of the error detecting system shown in FIG. 4.

While each of the embodiments of an error detecting system according to the present invention has been described as using two light sensitive transducer elements, an error detecting system proposed by the present invention may use only one light-sensitive transducer element. Such a transducer element, designated by reference numeral 44 in FIG. 8 of the drawings, is configured similarly to each of the first and second transducer elements 42 and 42′ shown in FIGS. 5A and 5B and, thus, has first, second, third and fourth light-sensitive surfaces f, g, h and i which are separate from one another across first and second junction lines j and k as shown in FIG. 8. As will be ready understood, a tracking error signal produced in an error detecting system using the transducer element 44 is representative of the difference between the sum (If+Ih) of the intensities If and Ih of light detected by the first and third light-sensitive surfaces f and h of the transducer element 44 and the sum (Ig+Ii) of the intensities Ig and Ii of light of the second and fourth light-sensitive surfaces g and i of the transducer element 44. On the other hand, a focus error signal is representative of the difference between the sum (If+Ig) of the intensities If and Ig of the first and second light-sensitive surfaces f and g and the sum (Ih and Ii) of the intensities Ih and Ii of light detected by the third and fourth light-sensitive surfaces h and i of the transducer element 44.

What is claimed is:

1. An optical information recording disc player in which an information recording disc optically carrying thereon video and/or audio information in the form of one or more circumferentially extending record tracks is rotated about the center axis thereof in the vicinity of an optical pick-up system, said pick-up system comprising:

optical means operative to emit a beam of light for tracing a target track of said record tracks and to produce a signal-carrying beam of light carrying thereon signals picked up from said record tracks during the rotation of the information recording disc;

beam-splitting means for splitting said signal-carrying beam of light into two component beam of light;

a first transducer element which is irradiated by one of said two component beams and has at least two discrete light-sensitive surfaces consisting of first and second light-sensitive surfaces which are separated from each other across a first junction line substantially parallel with a line tangent to said record tracks; and a second transducer element which is irradiated by the other component beam and has at least two discrete light-sensitive surfaces which are separated from each other by a second junction line substantially parallel with a line perpendicular to the record tracks.

2. An optical pick-up system as defined by claim 1, in which said first and second light-sensitive surfaces of said first transducer element are respectively separated into two sub-surfaces by a third junction line parallel with said second junction line.

3. An optical pick-up system as defined by claim 2, in which said two discrete light-sensitive surfaces of said second transducer element are respectively separated into two sub-surfaces by a fourth junction line parallel with said first junction line.

* * * * *